US011656558B2

(12) United States Patent
Oura et al.

(10) Patent No.: US 11,656,558 B2
(45) Date of Patent: May 23, 2023

(54) CHARGING ROLL

(71) Applicant: NOK CORPORATION, Tokyo (JP)

(72) Inventors: Kosuke Oura, Fujisawa (JP); Shogo Suzuki, Fujisawa (JP); Satoshi Fukuoka, Fujisawa (JP); Kenji Sasaki, Fujisawa (JP)

(73) Assignee: NOK CORPORATION

( * ) Notice: Subject to any disclaimer, the term of this patent is extended or adjusted under 35 U.S.C. 154(b) by 0 days.

(21) Appl. No.: 17/630,562

(22) PCT Filed: Jul. 20, 2020

(86) PCT No.: PCT/JP2020/028083
§ 371 (c)(1),
(2) Date: Jan. 27, 2022

(87) PCT Pub. No.: WO2021/039204
PCT Pub. Date: Mar. 4, 2021

(65) Prior Publication Data
US 2022/0260937 A1    Aug. 18, 2022

(30) Foreign Application Priority Data
Aug. 26, 2019    (JP) .............................. JP2019-153968

(51) Int. Cl.
*G03G 15/02*    (2006.01)
(52) U.S. Cl.
CPC ................................ *G03G 15/0233* (2013.01)
(58) Field of Classification Search
CPC ........................... G03G 15/02; G03G 15/0233

USPC ......................................... 399/168, 174, 176
See application file for complete search history.

(56) References Cited

U.S. PATENT DOCUMENTS

| 6,035,163 A | 3/2000 | Zona et al. |
| 2011/0299887 A1 | 12/2011 | Miyaji et al. |
| 2013/0343783 A1 | 12/2013 | Miyaji et al. |

(Continued)

FOREIGN PATENT DOCUMENTS

| JP | 2001-092221 A | 4/2001 |
| JP | 2005-091414 A | 4/2005 |
| JP | 2007-218993 A | 8/2007 |

(Continued)

OTHER PUBLICATIONS

International Search Report (English and Japanese) issued in PCT/JP2020/028083, dated Oct. 27, 2020; ISA/JP (5 pages).

(Continued)

*Primary Examiner* — Hoan H Tran
(74) *Attorney, Agent, or Firm* — Harness, Dickey & Pierce, P.L.C.

(57) ABSTRACT

A charging roll includes a core member, a rubber base material disposed around the core member, and a surface layer disposed around the rubber base material. The average of heights of contours of convex portions on a surface of the surface layer relative to an average cylindrical surface obtained by averaging surface irregularities of the surface layer is equal to or greater than 0.8 micrometers and is equal to or less than 2.1 micrometers. The average of intervals between apexes of the convex portions on the surface of the surface layer is equal to or greater than 6.6 micrometers and is equal to or less than 11.5 micrometers.

3 Claims, 3 Drawing Sheets

(56) References Cited

U.S. PATENT DOCUMENTS

2016/0252842 A1 9/2016 Sakurai et al.
2016/0266511 A1 9/2016 Kuroda

FOREIGN PATENT DOCUMENTS

| JP | 2009-009045 | A | | 1/2009 |
|----|-------------|---|---|--------|
| JP | 2012-014141 | A | | 1/2012 |
| JP | 2012-168259 | A | | 9/2012 |
| JP | 2014-089415 | A | | 5/2014 |
| JP | 2015-121769 | A | | 7/2015 |
| JP | 2016-164654 | A | | 9/2016 |
| JP | 2018025736  |   | * | 2/2018 |

OTHER PUBLICATIONS

Extended European Search Report for corresponding Application No. 20857539.9 dated Oct. 4, 2022 (7 Pages).
Notice of Reasons for Refusal for corresponding Japanese Patent Application No. 2021-542631 dated Sep. 14, 2022, with English translation (8 Pages).
Notice of Reasons for Refusal for corresponding Japanese Patent Application No. 2021-542631 dated Mar. 14, 2023 with English translation (9 Pages).

* cited by examiner

CHARGING ROLL

CROSS REFERENCE TO RELATED APPLICATIONS

This application is a U.S. National Phase Application under 35 U.S.C. 371 of International Application No. PCT/JP2020/028083, filed on Jul. 20, 2020, which claims priority to Japanese Patent Application No. 2019-153968, filed on Aug. 26, 2019. The entire disclosures of the above applications are expressly incorporated by reference herein.

BACKGROUND

Technical Field

The present invention relates to charging rolls used in image forming apparatuses.

Related Art

Image quality produced by an image forming apparatus such as an electrophotographic copying machine depends on uniformity of a charged state of the photoconductor element, which is affected by the surface roughness of a charging roll. JP-A-2015-121769, JP-A-2012-14141, and JP-A-2005-91414 are known as conventional techniques that relate to a surface roughness of charging rolls.

JP-A-2015-121769 describes a technique related to a charging member (charging roll) consisting of an electro-conductive support, an electroconductive elastic layer laminated on the electroconductive support, and an electroconductive resin layer laminated as the outermost layer on the electroconductive elastic layer. The electroconductive resin layer contains a matrix material and at least one kind of particles selected from a group consisting of resin particles and inorganic particles, the particles containing first particles, in which A is 10 micrometers to 7.0 micrometers, B1/A is 5.0 to 30.0, and $S_m$ is 50 micrometers to 400 micrometers, where the thickness of a portion of the electroconductive resin layer formed by the matrix material alone is A [micrometers], the mean particle diameter of the particles is B1 [micrometers], and the inter-particle distance is $S_m$ [micrometers].

JP-A-2012-14141 discloses a technique that relates to an image forming apparatus including a positively-charged single-layer type electrophotographic photoconductor element; a charging device having a contact-type charging member for charging the surface of the photoconductor element; an exposure device for exposing the surface of the charged image carrier to form an electrostatic latent image on the surface of the image carrier; a developing device for developing the electrostatic latent image as a toner image; and a transfer device for transferring the toner image from the image carrier to a transfer object. The contact-type charging member is a charging roller made from electroconductive rubber and has an Asker-C rubber hardness of 62 degrees to 81 degrees, and a surface roughness of the charging roller of the contact-type charging member has a mean interval $S_m$ of 55 micrometers to 130 micrometers between surface irregularities, and a ten-point height irregularity $R_z$ of 9 micrometers to 19 micrometers.

JP-A-2005-91414 discloses a technique that relates to a charging roller including an electroconductive support, a roll-shaped semi-electroconductive elastic layer formed on the electroconductive support, and a protective layer formed on the surface of the semi-electroconductive elastic layer. The protective layer is formed by application of a coating liquid for forming the protective layer containing fine particles that prevent adhesion of an external substance to the protective layer, with the volume average particle diameter of the fine particles being refined such that the surface roughness of the protective layer is equal to or less than 1 micrometer.

An object of JP-A-2015-121769, JP-A-2012-14141, and JP-A-2005-91414 is to control a discharge between the charging roll and the photoconductor element to make the discharge as uniform as possible, which is achieved by adjusting a surface roughness of the outermost surface of the charging roll by use of fine particles in the surface layer, to thereby improve an image quality.

Demand exists for image forming apparatuses that provide a high image quality.

SUMMARY

The present invention provides a charging roll that reduces image unevenness.

In an aspect of the present invention, a charging roll includes a core member, a rubber base material disposed around the core member, and a surface layer disposed around the rubber base material. The average of heights of contours of convex portions on a surface of the surface layer relative to an average cylindrical surface obtained by averaging surface irregularities of the surface layer is equal to or greater than 0.8 micrometers and is equal to or less than 2.1 micrometers. The average of intervals between apexes of the convex portions on the surface of the surface layer is equal to or greater than 6.6 micrometers and is equal to or less than 11.5 micrometers.

According to this aspect, image unevenness can be reduced.

DETAILED DESCRIPTION

Hereinafter, with reference to the accompanying drawings, various embodiments according to the present invention will be described. It is of note that the drawings are not necessarily to scale, and certain features may be exaggerated or omitted.

Figure 1:
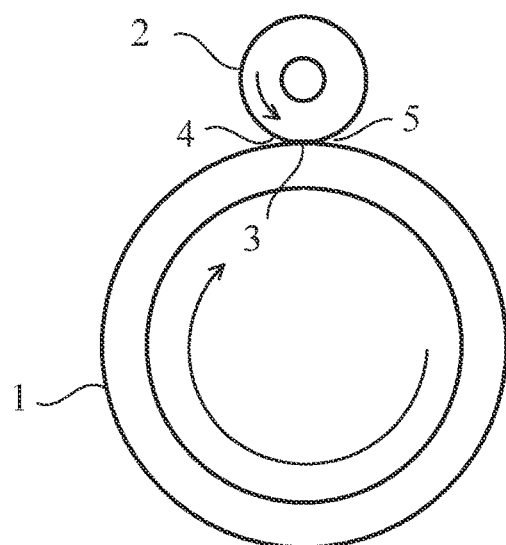
FIG. 1 is a schematic diagram showing a use of a charging roll according to an embodiment of the present invention.

As shown in FIG. 1, an image forming apparatus according to an embodiment of the present invention includes a photoconductor drum 1 and a charging roll 2 disposed near the photoconductor drum 1. Around the photoconductor drum 1, a developing unit, an exposure unit, a transfer unit, and a cleaning unit are arranged, but illustration of them is omitted since they are well-known.

The cylindrical and rotating photoconductor drum 1 and the cylindrical and rotating charging roll 2 are in contact with each other at the nip 3. Discharge between the photoconductor drum 1 and the charging roll 2 occurs in the region 4 in front of the nip 3 in the rotational direction of the photoconductor drum 1 and the charging roll 2 (in some cases, in addition to discharge in the region 4 in front of the nip 3 discharge occurs in the region 5 behind the nip 3), whereby the surface of the photoconductor drum 1 is charged. Usually, it has been considered that it is preferable that the charged state of the surface of the photoconductor drum 1 be uniform in both the circumferential direction and the axial direction of the photoconductor drum 1.

Figure 2:
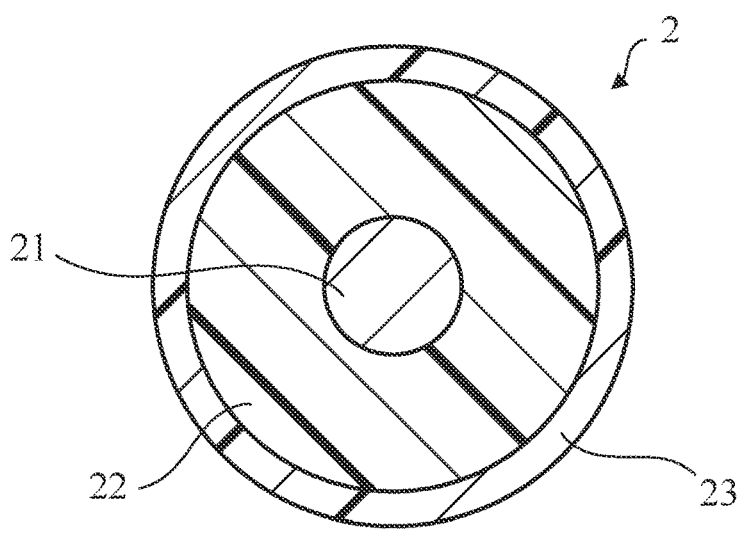
FIG. 2 is a cross-sectional view showing an example of the charging roll according to an embodiment of the present invention.

As shown in FIG. 2, an example of the charging roll 2 includes a core member 21, a rubber base material 22 formed on the outer peripheral surface of the core member 21, and a surface layer 23 coated on the outer peripheral surface of the rubber base material 22. By coating the outer peripheral surface of the rubber base material 22 with the surface layer 23 having a coating composition that is formed to have a suitable surface roughness, uneven discharge between the photoconductor drum 1 and the charging roll 2 can be prevented and uniform discharge can be provided to the photoconductor drum 1 such that an amount of toner that accurately corresponds to the latent image formed by the exposure can be adhered to the surface of the photoconductor drum 1.

The core member 21 can be formed from a metal or a resin material having excellent thermal conductivity and mechanical strength. The material of the core member 21 is not limited, but it can be made from, for example, a metal material such as stainless steel, nickel (Ni), nickel alloy, iron (Fe), magnetic stainless steel, and cobalt-nickel (Co—Ni) alloy, or a resin material such as PI (polyimide resin). The structure of the core member 21 is not particularly limited, and it may be hollow or not hollow.

The rubber base material 22 is formed from an electroconductive rubber having conductivity. The rubber base material 22 may be composed of a single layer or two or more layers. In addition, an adhesion layer, an adjustment layer, etc. may be interposed between the core member 21 and the rubber base material 22, as appropriate.

The rubber base material 22 can be formed by molding a rubber composition, which is obtained by adding a conductivity imparting material, a crosslinking agent, etc. to an electroconductive rubber, around the core member 21. Examples of the electroconductive rubber include polyurethane rubber (PUR), epichlorohydrin rubber (ECO), nitrile rubber (NBR), styrene rubber (SBR), and chloroprene rubber (CR).

As the conductivity imparting material, an electronic conductivity imparting material such as carbon black or metal powder, an ionic conductivity imparting material, or a mixture thereof can be used. Examples of the ionic conductivity imparting material include organic salts, inorganic salts, metal complexes, and ionic liquids. An example of an organic salt is sodium trifluoride acetate, and examples of the inorganic salt includes lithium perchlorate and quaternary ammonium salt. Examples of metal complexes include ferric halide-ethylene glycol, and specifically, those described in JP-B-3655364 can be used. The ionic liquid is a molten salt that is liquid at room temperature, and is referred to as a room temperature molten salt. The salt has a melting point of 70 degrees Celsius or less, preferably 30 degrees Celsius or less. Specifically, those described in JP-A-2003-202722 can be used.

The crosslinking agent is not particularly limited, and sulfur and a peroxide vulcanizing agent can be used.

Furthermore, a crosslinking aid, etc. that promotes action of the crosslinking agent may be added to the rubber composition, as appropriate. Examples of the crosslinking aid include inorganic materials, such as zinc oxide and magnesium oxide, and organic materials, such as stearic acid and amines. In addition, to shorten a time taken to achieve crosslinking, a thiazole-based or other crosslinking accelerator may be used. Other additives may be added to the rubber composition, as appropriate.

In manufacturing the charging roll 2, the surface of the rubber base material 22 formed on the outer peripheral surface of the core member 21 is first ground to have a predetermined thickness with a grinding machine, after which the surface of the rubber base material 22 is subjected to dry grinding with a grinding wheel. The surface layer 23 is then formed on the outer peripheral surface of the rubber base material 22. Grinding is performed to adjust the surface roughness of the rubber base material 22 as appropriate, and to thereby adjust the surface roughness of the surface layer 23 formed on the outer peripheral surface of the rubber base material 22.

In a case in which the surface roughness of the rubber base material 22 is to be minimized, the surface roughness (ten-point height irregularities) $R_Z$ according to JIS B 0601 (1994) of the rubber base material 22 is preferably equal to or less than 8.5 micrometers. The surface roughness $R_Z$ is measured by a contact-type surface roughness meter.

Dry grinding is performed, for example, in a state in which the rubber base material 22 is rotated, by moving the rotary grinding wheel along the axial direction of the core member 21 while the wheel is in contact with the rubber base material 22 (traverse grinding). In a case in which the surface roughness of the rubber base material 22 is to be minimized, the number of revolutions of the grinding wheel of the grinding machine may be gradually increased, for example, from 1000 rpm, to 2000 rpm, to 3000 rpm. Alternatively, the coarseness of a grinding wheel may be progressively changed. For example, a GC (green carborundum) grinding wheel may be changed, for example, from a GC 60 wheel, to a GC 120 wheel, to a GC 220 wheel.

In addition, after the surface of the rubber base material 22 is dry-ground, the surface may be wet ground with a wet grinding machine in which a waterproof grinding paper such as waterproof sandpaper is employed, with the rubber base material 22 being brought into contact with the sandpaper under supply of a grinding liquid.

The hardness of the rubber base material 22 measured by use of a durometer "Type A" according to JIS K 6253 and ISO 7619 is preferably within a range from 50 degrees to 64 degrees.

The surface layer 23 formed on the rubber base material 22 is thin, and thus a hardness of the surface of the charging roll 2 is affected by a hardness of the rubber base material 22. In a case in which the hardness of the rubber base material 22 is less than 50 degrees, convex portions on the surface of the charging roll 2 are likely to be crushed and contaminate the photoconductor drum 1, and cause image defects. On the other hand, if the hardness of the rubber base material 22 is greater than 64 degrees, convex portions on the surface of the charging roll 2 may affect the image.

A coating liquid is applied to the outer peripheral surface of the rubber base material 22 and dried and cured, thereby forming the surface layer 23. Application of the coating liquid may be carried out by dip coating, roll coating, spray coating, or the like.

Figure 3:
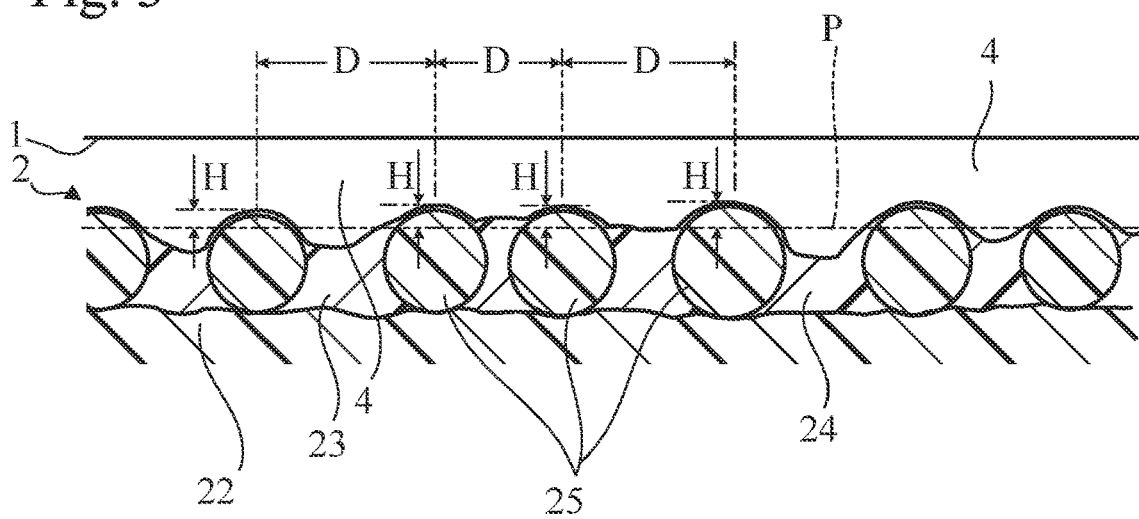
FIG. 3 is a cross-sectional view of a rubber base material and a surface layer cut along a plane including the axis of the charging roll.
Figure 4:
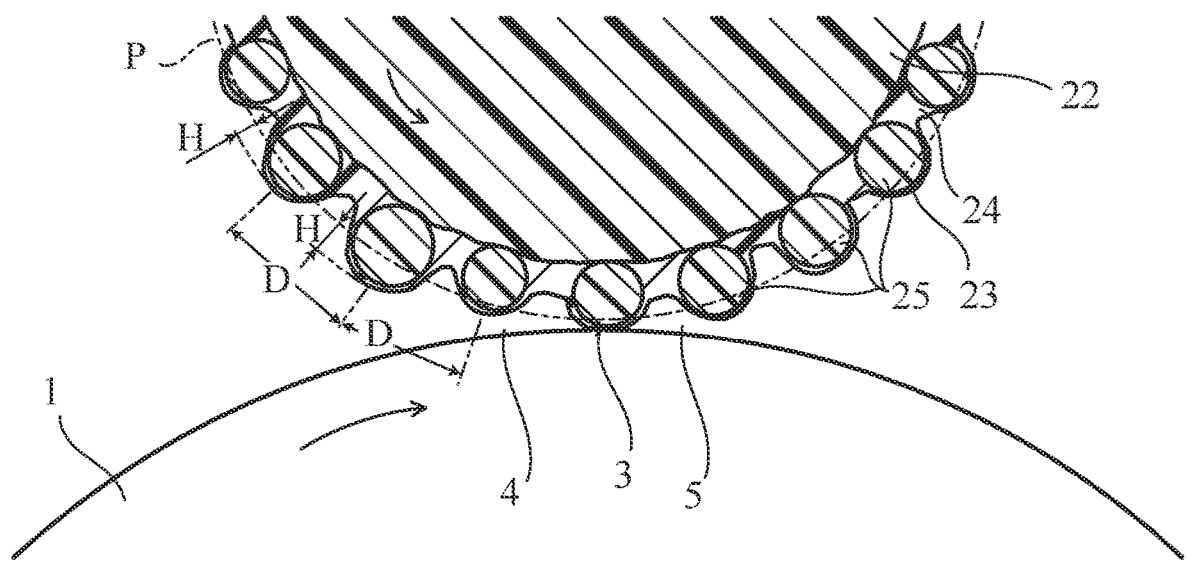
FIG. 4 is a cross-sectional view of the rubber base material and the surface layer cut along a plane orthogonal to the axis of the charging roll.

As shown in FIGS. 3 and 4, the cured surface layer 23 includes an electroconductive matrix 24 and particles 25 of a surface roughness enhancing material (also referred to as a roughness enhancing material), which may be, e.g., an electric insulator, dispersed in the electroconductive matrix 24.

The particles 25 of the roughness enhancing material provide the surface layer 23 with an appropriate surface roughness. If the surface of the surface layer 23 is too smooth, the coefficient of friction between the surface layer 23 and the photoconductor drum 1 increases, so that not only the torque for the photoconductor drum 1 and the charging roll 2 increases, but also the static electricity caused by the friction adversely affects the charged state. This is considered to be a cause of image unevenness. In the present embodiment, the surface roughness of the surface layer 23 is adjusted by dispersing the particles 25 of the surface roughness enhancing material in the surface layer 23 formed on the rubber base material 22 of which the surface roughness has been adjusted.

The electroconductive matrix 24 serves to hold the particles 25 of the roughness enhancing material in position and serves to effect discharge to the photoconductor drum 1. The electroconductive matrix 24 contains a base material and an electroconductive material dispersed in the base material. As described above, discharge occurs between the charging roll 2 and the photoconductor drum 1 in the region 4 (and in some cases in the region 5, also).

In the example shown in FIG. 3, the particles 25 of the roughness enhancing material are completely embedded in the electroconductive matrix 24 and are covered with a thin film of the electroconductive matrix 24. If the thickness of the electroconductive matrix 24 is small, the ability of the matrix to hold the particles 25 of the roughness enhancing material will also be low. Accordingly, it is preferable for the electroconductive matrix 24 to have a thickness that is sufficient relative to the diameter of the particles 25 of the roughness enhancing material. On the other hand, if the thickness of the electroconductive matrix 24 is too large, the surface roughness of the surface layer 23 becomes too small, and the coefficient of friction between the surface layer 23 and the photoconductor drum 1 increases. Therefore, it would be preferable for the thickness of the electroconductive matrix 24 to be within an appropriate range.

When the particles 25 of the roughness enhancing material are made from an electric insulator, when the thickness of the electroconductive matrix 24 is large, and when the electrical resistance of the electroconductive matrix 24 is large, discharge is less likely to occur. However, by increasing the proportion of the electroconductive material contained in the electroconductive matrix 24, the electrical resistance of the electroconductive matrix 24 can be reduced to facilitate occurrence of discharge.

It would be preferable for the amount of the particles 25 of the roughness enhancing material in the surface layer 23 to be within an appropriate numerical range. It is contemplated that if the amount of the particles is large, the particles may overlap, causing the surface of the surface layer 23 to be rough, and resulting image unevenness.

In this embodiment, the composition of the coating liquid that is the material of the surface layer 23 contains at least the base material, the electroconductive material, and the particles 25 of the surface roughness enhancing material. After curing of the coating liquid, the base material and the electroconductive material become components of the electroconductive matrix 24.

The coating liquid is obtained, for example, by dissolving in a diluent solvent the following components.

Base material, 10 to 80 parts by weight;
electroconductive material, 1 to 50 parts by weight; and
surface roughness enhancing material, 70% by weight or less of the total amount of the coating liquid.

It is contemplated that when the surface state of the surface layer 23 is appropriate, discharge between the charging roll 2 and the photoconductor drum 1 will be substantially uniform in the region 4 before the nip 3, at which the charging roll 2 and the photoconductor drum 1 are in contact with each other, so that uneven discharge will not occur upon image formation, whereby an image of a desired density will be formed, with an end result of provision of high image quality.

It is considered that the surface state of the surface layer 23 can be adjusted as appropriate by adjusting the particle diameter and the amount of the particles 25 of the surface roughness enhancing material.

The base material contained in the coating liquid is an electric insulator. Examples of preferred electric insulators include urethane resin, acrylic resin, acrylic urethane resin, amino resin, silicone resin, fluorine resin, polyamide resin, epoxy resin, polyester resin, polyether resin, phenol resin, urea resin, polyvinylbutyral resin, melamine resin, nylon resin, etc. The electric insulators may be used alone or in combination for the base material.

Examples of the electroconductive material suitably contained in the coating liquid include a carbon black such as acetylene black, Ketjen black, and Tokablack, a carbon nanotube, an ion such as lithium perchloride, an ionic liquid such as 1-butyl-3-methylimidazolium hexafluorophosphate, and a metal oxide such as tin oxide, and an electroconductive polymer. These electroconductive materials may be used alone or in combination in the coating liquid.

Examples of the particles 25 of the surface roughness enhancing material suitably contained in the coating liquid include acrylic particles, urethane particles, polyamide resin particles, silicone resin particles, fluororesin particles, styrene resin particles, phenol resin particles, polyester resin particles, olefin resin particles, epoxy resin particles, nylon resin particles, carbon, graphite, carbide balloon, silica, alumina, titanium oxide, zinc oxide, magnesium oxide, zirconium oxide, calcium sulfate, calcium carbonate, magnesium carbonate, calcium silicate, aluminum nitride, boron nitride, talc, kaolin clay, diatomaceous earth, glass beads, hollow glass spheres, etc. These particles may be used alone or in combination in the coating liquid.

It is considered that there is a preferable range with respect to the relationship between the particle diameter and the amount of the particles 25 of the surface roughness enhancing material in the coating liquid in order to improve the image quality.

The diluent solvent contained in the coating liquid is not particularly limited, and examples thereof include an aqueous-based solvent or other solvents such as methyl acetate, ethyl acetate, butyl acetate, methyl ethyl ketone (MEK), methyl isobutyl ketone (MIBK), methanol, ethanol, butanol, 2-propanol (IPA), acetone, toluene, xylene, hexane, heptane, and chloroform.

The inventors focus on the heights H of convex portions on the surface layer 23 and the interval D between the convex portions on the surface layer 23 as parameters representing states of the surface of the surface layer 23 that control the discharge state between the charging roll 2 and the photoconductor drum 1 (see FIGS. 3 and 4). Here, the "convex portions" are portions protruding outward in radial directions from an average cylindrical surface P obtained by averaging the surface irregularities of the surface layer 23. In contrast, portions that are located radially inward from the average cylindrical surface P will be hereinafter referred to as "concave portions". In FIGS. 3 and 4, for ease of understanding, heights H of apexes of the convex portions are shown as the heights of the convex portions.

In the region 4 in front of the nip 3, it is assumed that the discharge to the photoconductor drum 1 mainly occurs at the convex portions on the surface layer 23, which are closest to the photoconductor drum 1. In this case, the discharge distance between the photoconductor drum 1 and the charging roll 2 in the region 4 is dominated by the heights H of the convex portions. It is also assumed that the discharge in the region 4 occurs at localized points (corresponding to the convex portions) in the tangential plane to the surface of the charging roll 2, and the interval between the localized discharge points is equal to the interval D between the convex portions.

The inventors conducted experiments to determine the average height of the contours of the convex portions and the average interval between the apexes of the convex portions on the surface of the surface layer 23 of the charging roll 2 that are suitable for reducing image unevenness.

Experiment 1

In Experiment 1, samples 1 to 8 of the charging roll 2 according to the embodiment were manufactured.

The rubber base material 22 of samples 1 to 8 was formed as described below.

A rubber composition obtained by adding 0.5 parts by weight of sodium trifluoroacetate (as a conductivity imparting material), 3 parts by weight of zinc oxide, 2 parts by weight of stearic acid, and 1.5 parts by weight of a crosslinking agent to 100 parts by weight of epichlorohydrin rubber ("Epichlomer CG-102" manufactured by Osaka Soda Co., Ltd., Osaka, Japan) was kneaded with a roll mixer.

The kneaded rubber composition was formed into a sheet material and wound around the surface of a core member 21 having a diameter of 6 mm. The sheet material was press-molded to form a rubber base material 22 made from crosslinked epichlorohydrin rubber.

The hardness of the resulting rubber base material 22 was measured using a durometer "Type A" according to JIS K 6253 and ISO 7619. The measured hardness was within a range from 50 degrees to 64 degrees.

Next, the surface of the rubber base material 22 was ground with a grinding machine. More specifically, the surface of the rubber base material 22 was ground with a grinding machine to provide the rubber base material 22 with a predetermined thickness (1.25 mm), followed by dry grinding in which the rotation speed of the grinding wheel of the grinding machine was gradually increased from 1000 rpm, to 2000 rpm, to 3000 rpm. That is, in Experiment 1, the surface roughness of the rubber base material 22 was minimized.

A coating liquid for forming the surface layer 23 on the outer peripheral surface of the rubber base material 22 described above was prepared. The composition of the coating liquid is as shown in Table 1.

TABLE 1

| | | Composition of Coating Liquid | |
| --- | --- | --- | --- |
| Function | Material | Material Details | Ratio (Parts by Weight) |
| Diluent Solvent | Ethyl Acetate | | 60.0 |
| Base Material | Urethane Resin | | 19.9 |
| | | Contents of Base Material | |
| | Polyol | "T6650E" Manufactured by Asahi Kasei Chemicals Corp. (Tokyo, Japan) | 10.8 |
| | Isocyanurate | "TPA-100" Manufactured by Asahi Kasei Chemicals Corp. | 9.1 |
| Electroconductive Material | Carbon Dispersed Liquid | "MHI-BK" (Including 20 to 30 Weight % of Carbon) Manufactured by Mikuni Color Ltd. (Hyogo, Japan) | 18.4 |
| Additive | Acrylic Silicone Polymer | "MODIPER FS-700" Manufactured by NOF Corp. (Tokyo, Japan) | 1.0 |
| Surface Roughness Enhancing Material | Urethane Particles | Urethane Beads Manufactured by Negami Chemical Industrial Co., Ltd. (Ishikawa, Japan) | See Table 2 |

Urethane beads manufactured by Negami Chemical Industrial Co., Ltd. (Ishikawa, Japan) were used as the urethane particles in the coating liquid. The relationship between the average particle diameter of the urethane beads and the product name used in Experiments 1 and 2 is as follows. It is of note that in practice, one product contains particles having diameters that differ from the average particle diameter.

6 micrometers: Urethane beads "C-800"

10 micrometers: Urethane beads "C-600"

In Experiment 1, samples 1 to 8 having different surface conditions of the surface layer 23 were produced by applying coating liquids containing particles 25 of the surface roughness enhancing material having different particle diameters and in different amounts.

The coating liquid having the above composition was stirred with a ball mill for 3 hours.

The surface layer 23 was formed by applying the coating liquid to the outer peripheral surface of the ground rubber base material 22, to manufacture a charging roll 2. Specifically, the coating liquid was stirred, and the liquid was spray-coated on the surface of the rubber base material 22, and dried in an electric furnace at 120 degrees Celsius for 60 minutes to form the surface layer 23 on the outer peripheral surface of the rubber base material 22, to produce samples 1 to 8 of a charging roll.

For samples 1 to 8, the following procedure was used to calculate the average height of the contours of the convex portions and the average interval between the apexes of the convex portions on the surface of the surface layer 23.

First, a part of the surface of the central portion in the axial direction of the charging roll 2 was photographed with a non-contact type laser microscope. The laser microscope used was a "VK-X200" manufactured by Keyence Corporation (Osaka, Japan). Magnification was 400 times, and the magnification of the objective lens used was 20 times. The photographic field of view has 535.048 micrometers along the circumferential direction of the charging roll 2 and has 713.397 micrometers along the axial direction of the charging roll 2. The area the field of view was 381701.6 square micrometers.

Next, using Version 1 3.0.116 of the multi-file analysis application "VK-H1XM" produced by Keyence Corporation, the second-order curved surface correction was performed for the geometric data obtained by photographing. Second-order curved surface correction is a process of removing data components corresponding to the cylindrical surface of the charging roll 2 from the geometrical data obtained by photographing. In other words, it is a process of converting the geometric data on the cylindrical surface obtained by photographing into geometric data on a plane, as shown in FIG. 5.

Next, with use of the "Volume Area Measurement" function of the application, the average height of the surface irregularities (the surface contour) in the photographed field of view was calculated. In the calculation, "Ignore Micro Regions" of the "Volume Area Measurement" function was selected, and "100 Pixels" was selected for micro regions. In other words, heights of the contours involving the convex and concave portions on the surface were obtained at a pitch of 100 pixels in the image taken by the laser microscope, and the average height of the surface contours was calculated. For the "Setting Height Threshold" in the "Volume Area Measurement" function, "Minimum" was selected.

Figure 5:
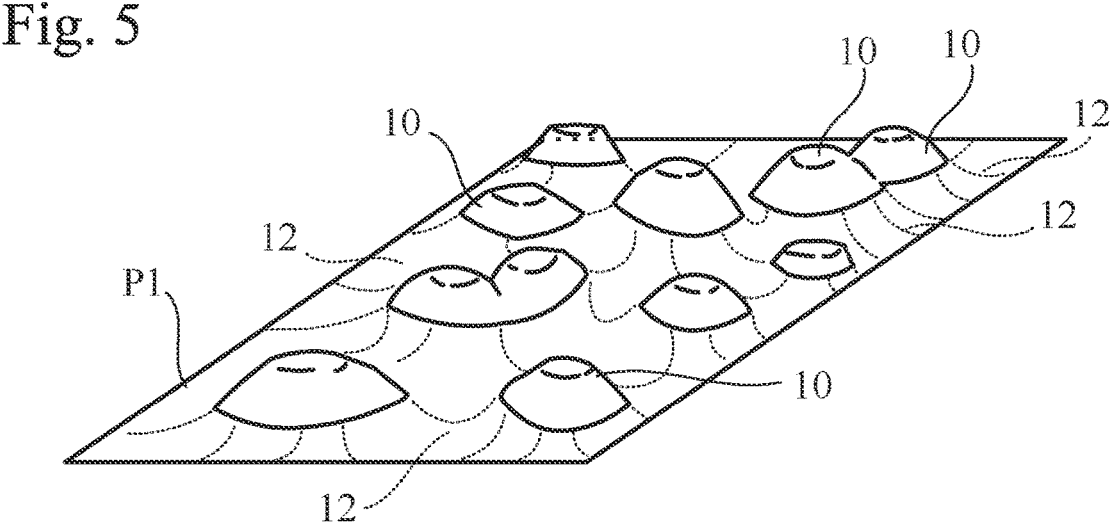
FIG. 5 is a schematic perspective view of the surface of the charging roll on the assumption that the surface of the cylindrical surface layer is projected onto a plane.

In FIG. 5, an average plane P1 corresponding to the average height is shown. The average plane P1 is a plane when the aforementioned average cylindrical surface P is assumed to be projected into a plane.

Next, using the "Volume Area Measurement" function of the application, the average height of the contours of the convex portions 10 was calculated in which the calculated average height of the surface irregularities was defined as the zero level. Specifically, the calculated average height of the surface irregularities was entered as the "Height Threshold" in the "Setting Height Threshold" of the "Volume Area Measurement" function. As a result, portions with heights greater than the average height (portions higher than the average plane P1) were recognized as convex portions 10 shown in FIG. 5, and the average height of the contours of the convex portions 10 was calculated. In other words, concave portions 12, which are portions having heights less than the average height, were ignored. In the calculation, "Ignore Micro Regions" of the "Volume Area Measurement" function was selected, and "100 Pixels" was selected for micro regions. In other words, heights of contours of the convex portions 10 on the surface were obtained at a pitch of 100 pixels in the image taken by the laser microscope, and the average height of the contours of the convex portions 10 was calculated.

In addition, the volume (total volume) of all convex portions 10 was calculated in the photographed field of view using the "Volume Area Measurement" function of the application. "Ignore Micro Regions" function was the same as above, and in the "Setting Height Threshold", the average height of the irregularities was still used as the "Height Threshold".

The calculated total volume of the convex portions 10 was then divided by the average height of the contours of the convex portions 10. The result was considered as the area (total area) of all convex portions 10. In other words, the total area of the portions higher than the average plane P1 was obtained.

Next, the total area of the convex portions 10 thus obtained were divided by the maximum cross-sectional area of the particles 25 of the surface roughness enhancing material having the average particle diameter, and therefore the number of particles 25 of the surface roughness enhancing material per total area of the convex portions 10 was calculated. The maximum cross-sectional area of the particles 25 of the surface roughness enhancing material having the average particle diameter was calculated by multiplying the square of half of the average particle diameter by $\pi$. Furthermore, the area of the photographed field of view (photographed area) was divided by the number of particles 25 of the surface roughness enhancing material per total area of the convex portions 10, so that the area of a section in which each convex portion 10 was allocated on the assumption that the convex portions 10 were evenly allocated in the field of view. Then, the square root of the area of the section was calculated as the average of the intervals between the apexes of the convex portions 10.

Figure 6:
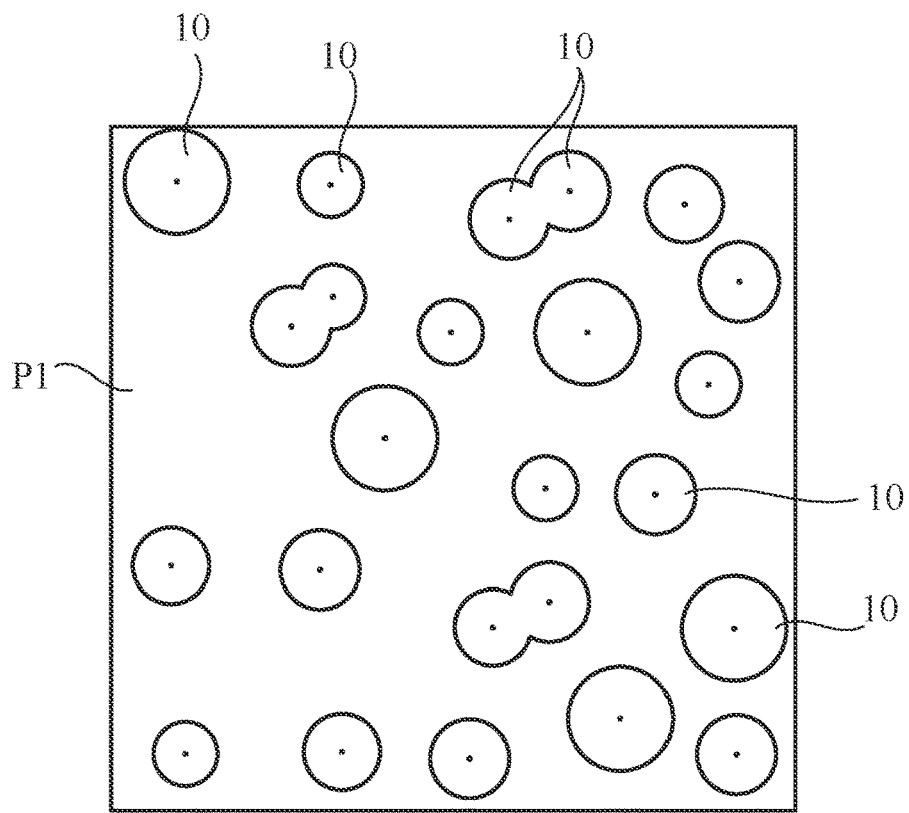
FIG. 6 is a schematic view showing a plurality of convex portions in a region on the surface of the surface layer of the charging roll.
Figure 7:
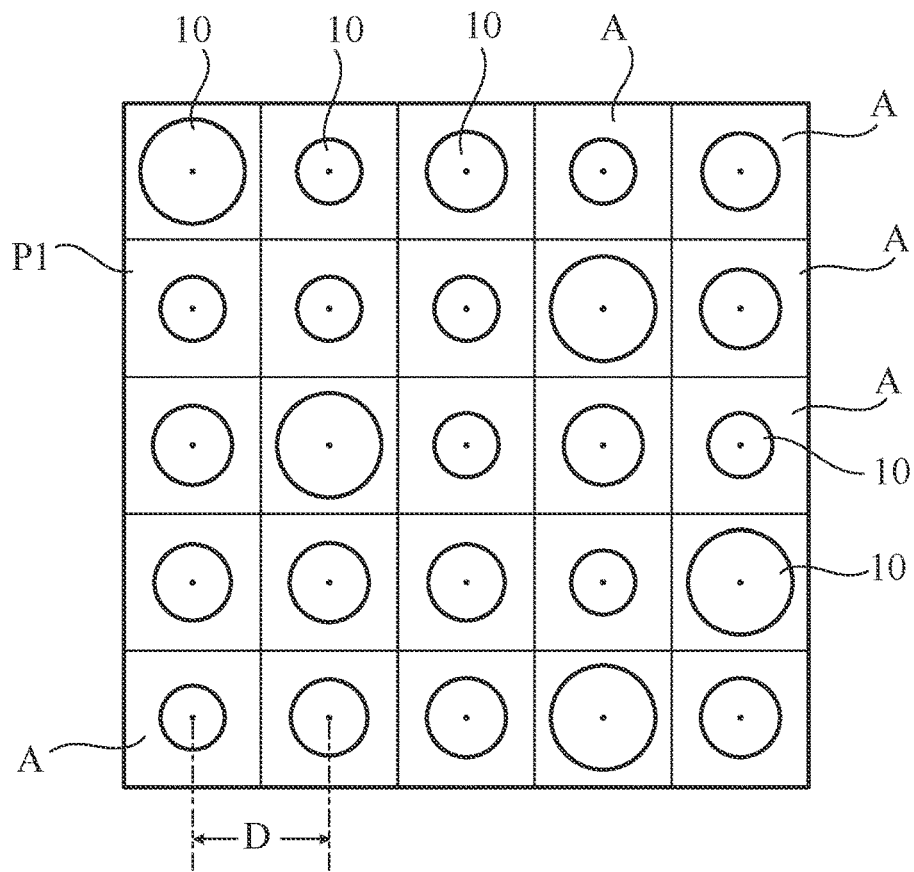
FIG. 7 is a virtual schematic diagram on the assumption that the plurality of convex portions shown in FIG. 6 are evenly allocated to a plurality of sections in the region.

As shown in FIG. 6, in the photographed field of view, the convex portions 10 are randomly distributed, and multiple convex portions 10 overlap in some cases. By dividing the photographed area by the number of particles 25 of the surface roughness enhancing material per total area of the convex portions 10, as shown in FIG. 7, the area of a square section A in which each convex portion 10 is allocated on the assumption that the convex portions 10 are evenly allocated in the field of view is calculated. The square root of the square section A is the length of one side of the square section A and the interval between the apexes of the evenly distributed convex portions 10.

The average of heights of the contours of the convex portions 10 and the average of intervals between the apexes of the convex portions 10 on the surface of the surface layer 23 of each sample calculated in this way are shown in Table 2. The calculated average height of the contours of the convex portions 10 on the surface of the surface layer 23 is considered to be the average of heights of the contours of the plurality of convex portions 10 relative to the average cylindrical surface P of the surface irregularities of the surface layer 23. The calculated average of intervals between the apexes of the convex portions 10 on the surface of the surface layer 23 is considered to be the average of intervals between the apexes of the plurality of convex portions 10 on the surface of the surface layer 23.

TABLE 2

| | Surface Roughness Enhancing Material | | | Average Height of | | Average of Intervals Between | | Image Unevenness | | Image |
|---|---|---|---|---|---|---|---|---|---|---|
| | Average Particle Diameter (μm) | Amount in Coating Liquid (wt %) | Total Volume of Convex Portions (μm³) | Contours of Convex Portions (μm) | Photographed Area (μm³) | Apexes of Convex Portions (μm) | | Local Discharge | Scumming | Comprehensive Judgment |
| Sample 1 | 10 | 2  | 190593 | 0.834 | 381702 | 11.4 | | Good | Good | Good |
| Sample 2 | 10 | 2  | 289942 | 1.267 | 381702 | 11.5 | | Good | Good | Good |
| Sample 3 | 6  | 20 | 519257 | 2.138 | 381702 | 6.7  | | Good | Good | Good |
| Sample 4 | 6  | 10 | 329782 | 1.325 | 381702 | 6.6  | | Good | Good | Good |
| Sample 5 | 10 | 2  | 354753 | 1.406 | 381702 | 10.9 | | Good | Good | Good |
| Sample 6 | 6  | 2  | 253097 | 1.170 | 381702 | 7.1  | | Good | Good | Good |
| Sample 9 | 10 | 7  | 474784 | 2.015 | 381702 | 11.3 | | Good | Good | Good |
| Sample 7 | 10 | 2  | 146611 | 0.733 | 381702 | 12.2 | | Bad  | Bad  | Bad  |
| Sample 8 | 10 | 10 | 330385 | 1.576 | 381702 | 12.0 | | Bad  | Bad  | Bad  |

An image evaluation test of each sample of the charging roll 2 was conducted using a copying machine. The copying machine was a color multifunction peripheral (MFP) "bizhub C3850" (DC-voltage supply type) manufactured by Konica Minolta Inc. (Tokyo, Japan).

The applied charging voltage was measured with a tester. In Experiment 1, a voltage (REF—100 V), which was 100 V lower than the normal voltage (REF), was applied by way of an external power supply.

The charging roll was applied to the copying machine, and image unevenness was evaluated for images (halftone images and white solid images) printed under the conditions described below. The results are shown in Table 2.

Printing Conditions
Speed: 38 sheets/minute
Printing environment: The temperature was 23 degrees Celsius and the humidity was 55%.

For the image unevenness evaluation, occurrence of local discharge was judged on the basis of the halftone images, and lightness was judged on the basis of the white solid images.

Occurrence of local discharge was confirmed by visual detection of white spots, black spots, white streaks, or black streaks in the halftone images. In Table 2, "Good" means that there is no image unevenness caused by local discharge, and "Bad" means that there is image unevenness caused by local discharge.

In lightness determination, the L* value (lightness) was measured at seven points in each of the white solid images by a chroma meter, "CR-400" manufactured by Konica Minolta Inc. The lightness was evaluated with the following evaluation criteria. The reason why the lightness was measured was to determine whether scumming, i.e., fogging (printing on a non-print area) occurred.

Evaluation Criteria in Lightness Determination
Good: No scumming (L* is 95.5 or more)
Bad: Scumming (L* is lower than 95.5)

Samples in which image unevenness occurred due to local discharge or scumming were judged to be bad in image comprehensive judgment, and these were described in Table 2.

Experiment 2

In Experiment 2, sample 9 of the charging roll 2 according to the embodiment was manufactured.

The rubber base material 22 of sample 9 was formed in accordance with the same manner as that for the rubber base material 22 in Experiment 1.

The surface of the rubber base material 22 was ground with a grinding machine. More specifically, the surface of the obtained rubber base material 22 was ground with a grinding machine to provide the rubber base material 22 with a predetermined thickness (2 mm), after which dry grinding was applied. In Experiment 2, the rotation speed of the grinding wheel was not changed.

A coating liquid for forming the surface layer 23 on the outer peripheral surface of the rubber base material 22 was prepared. The composition of the coating liquid is shown in Table 1. Urethane beads manufactured by Negami Chemical Industrial Co., Ltd. were used as the urethane particles in the coating liquid.

In Experiment 2, sample 9 was produced by applying coating liquids containing particles 25 of the surface roughness enhancing material having particle diameters and in amounts shown in Table 2.

The coating liquid having the above composition was stirred with a ball mill for 3 hours.

In the same manner as in Experiment 1, the surface layer 23 was formed by applying the coating liquid to the outer peripheral surface of the ground rubber base material 22, to manufacture a charging roll 2.

In the same procedure as in Experiment 1, the average height of the contours of the convex portions and the average interval between the apexes of the convex portions on the surface layer 23 were calculated for sample 9. The average of heights of the contours of the convex portions and the average of intervals between the apexes of the convex portions on the surface of the surface layer 23 of each sample calculated in this way are shown in Table 2. The calculated average height of the contours of the convex portions 10 on the surface of the surface layer 23 is considered to be the average of heights of the contours of the plurality of convex portions 10 relative to the average cylindrical surface P of the surface irregularities of the surface layer 23. The calculated average of intervals between the apexes of the convex portions 10 on the surface of the surface layer 23 is considered to be the average of intervals between the apexes of the plurality of convex portions 10 on the surface of the surface layer 23.

An image evaluation test of the samples of the charging roll 2 was conducted using a copying machine that is different from the machine used in Experiment 1. The copying machine was a color multifunction peripheral (MFP) "MP C5503" (AC/DC voltage-superimposed supply type) manufactured by Ricoh Company, Ltd. (Tokyo, Japan).

The DC voltage was the normal voltage (REF), and the AC voltage Vpp was controlled by the copying machine. In Experiment 2, the alternating current was set at 1.40 mA, which is lower than the normal alternating current (REF) of the copying machine.

The charging roll was applied to the copying machine, and the image unevenness was evaluated for images (halftone images and white solid images) printed under the following printing conditions. The results are shown in Table 2.

Printing Conditions

Speed: 30 sheets/minute

Printing environment: The temperature was 23 degrees Celsius and the humidity was 55%.

For the image unevenness evaluation, occurrence of local discharge was judged on the basis of the halftone images, and occurrence of scumming, i.e., fogging was judged by visual detection in the white solid images.

Occurrence of local discharge was confirmed by visual detection of white spots, black spots, white streaks, or black streaks in the halftone images. In table 2, "Good" means that there is no image unevenness caused by local discharge, and "Bad" means that there is image unevenness caused by local discharge.

It was judged whether or not scumming, i.e., fogging (printing on a non-print area) by visual detection. In table 2, "Good" means that there is no scumming, and "Bad" means that there is scumming.

As will be apparent from Table 2, it is preferable for the average of heights of contours of convex portions 10 relative to an average cylindrical surface P obtained by averaging surface irregularities of the surface layer 23 to be equal to or greater than 0.8 micrometers and to be equal to or less than 2.1 micrometers, and for the average of intervals between apexes of the convex portions 10 on the surface of the surface layer 23 to be equal to or greater than 6.6 micrometers and to be equal to or less than 11.5 micrometers.

The invention claimed is:

1. A charging roll comprising:

a core member, a rubber base material disposed around the core member, and a surface layer disposed around the rubber base material, wherein an average of heights of contours of convex portions on a surface of the surface layer relative to an average cylindrical surface obtained by averaging surface irregularities of the surface layer is equal to or greater than 0.8 micrometers and is equal to or less than 2.1 micrometers, and wherein an average of intervals between apexes of the convex portions on the surface of the surface layer is equal to or greater than 6.6 micrometers and is equal to or less than 11.5 micrometers.

2. The charging roll according to claim 1, wherein the surface layer comprises an electroconductive matrix comprising a base material formed of an electric insulator and an electroconductive material being dispersed in the base material, and particles of a surface roughness enhancing material being dispersed in the electroconductive matrix.

3. The charging roll according to claim 2, wherein the particles of the surface roughness enhancing material are formed of an electric insulator.

* * * * *